May 29, 1934. M. OBERDORFER Re. 19,187
MAKING AND WAXING OF A SHEET OF PAPER BY A PAPER MAKING MACHINE
Original Filed May 18, 1932 2 Sheets-Sheet 1
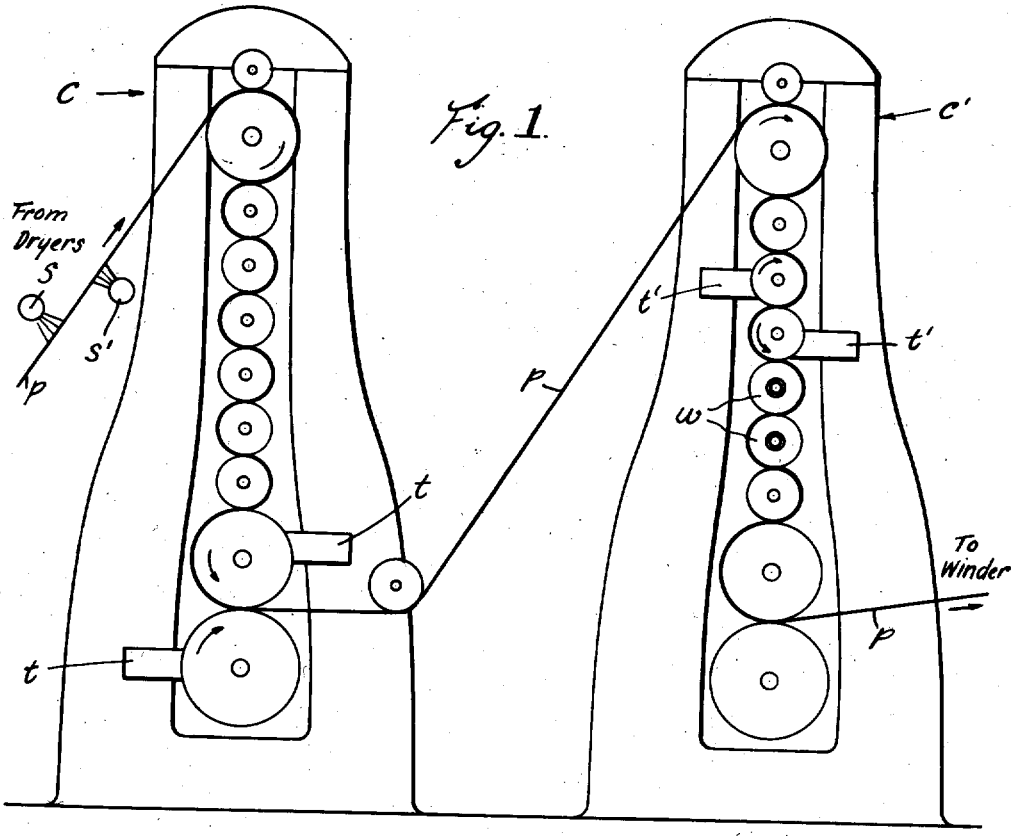
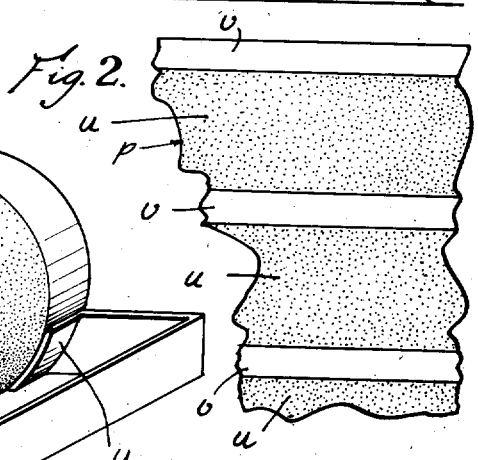
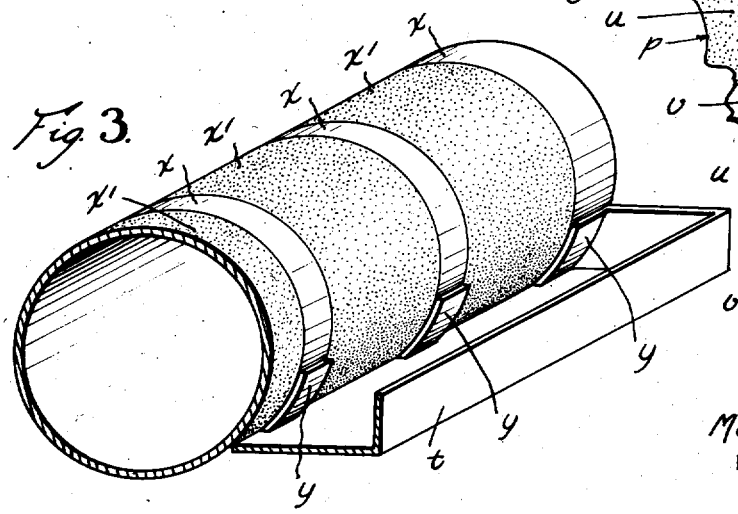
INVENTOR
Max Oberdorfer
BY
ATTORNEY May 29, 1934. M. OBERDORFER Re. 19,187

MAKING AND WAXING OF A SHEET OF PAPER BY A PAPER MAKING MACHINE

Original Filed May 18, 1932 2 Sheets-Sheet 2

INVENTOR
Max Oberdorfer
BY
ATTORNEY

Reissued May 29, 1934 Re. 19,187

UNITED STATES PATENT OFFICE 19,187

MAKING AND WAXING OF A SHEET OF PAPER BY A PAPER MAKING MACHINE

Max Oberdorfer, St. Helens, Oreg.

Original No. 1,915,865, dated June 27, 1933, Serial No. 612,038, May 18, 1932. Application for reissue March 5, 1934, Serial No. 714,194

3 Claims. (Cl. 92—40)

My invention relates to the waxing of a paper sheet, and the object of my invention is to apply the wax—which term is to be understood as designating paraffin, emulsions of paraffin and any mixture of paraffin and solvent, and similar material—in the form of a closely adhering smooth, uniform, finished film, on one or both sides of the paper web, thus performing in a single operation that which in the usual, present mode of manufacturing waxed paper requires two steps, namely, first making the paper sheet and then, by a second and distinct operation, waxing it.

In carrying my invention into practice, I accomplish the application of the wax to the paper web in the calender section of the paper making machine; and the reducing to a film the amount of wax applied to the sheet I preferably accomplish by reducing the absorptive property of the paper web. This may be done in different ways. One way is to press the fibers of the paper web very firmly together in order to render the sheet very dense and thus less absorptive. This result is accomplished by passing the paper web thru the greater part of the calender section before applying the wax; or by passing the paper thru an auxiliary calender stack. Another way of reducing the absorptive property of the paper web is to moisten it as it passes from the drier section of the paper making machine to the calender stack.

The moistening is preferably accomplished by applying to one or both sides of the web a mist like spray of water. But the preliminary step of reducing the absorptiveness of the web is not indispensable, and very good results are obtained by omitting such step.

The wax is applied by providing on one or more rolls of the calender stack—according to whether one or both sides of the paper web is to be waxed—a box, or trough containing the melted, or liquid paraffin or similar material. The roll of the calender stack provided with said trough may be heated if deemed advisable to facilitate spreading of the wax over the sheet; and the adjacent, following rolls of the calender stack may be chilled to promote the setting of the wax.

Another object of my invention is to limit the application of the wax to longitudinally extending sections or strips of the paper web, and to leave unwaxed adjacent longitudinally extending surfaces. Such restrictions of the waxing I believe desirable for the reason that if the entire surface of the sheet is waxed as it runs thru the calender stack, the rolls of the latter are prone to slip on each other; for the rolls become more or less warm in action, due to friction, and thus the film of liquid wax tends to act as a lubricant; while, as well known, the rolls composing the calender stack are driven only by their frictional contact with each other. Therefore by leaving certain longitudinal sections of the paper web free of the wax, such surfaces provide a friction surface between cooperating rolls of the calender stack, and assure their rotative cooperation as the paper web passes between them.

The devices and the arrangement by which I carry my invention into practice are illustrated in the accompanying drawings.

In the drawings:

Fig. 1 diagrammatically represents the calender section of a paper making machine;

Fig. 2 represents a section of the paper web after it has been waxed in the machine; illustrating that certain longitudinal sections or strips of the paper sheet have been left unwaxed in order to provide frictional surfaces between the rolls of the calender section and to assure their cooperative rotation;

Fig. 3 illustrates diagrammatically the trough provided with means adapted to keep the wax from being applied to the marginal and middle portions of the paper sheet.

Figure 4:
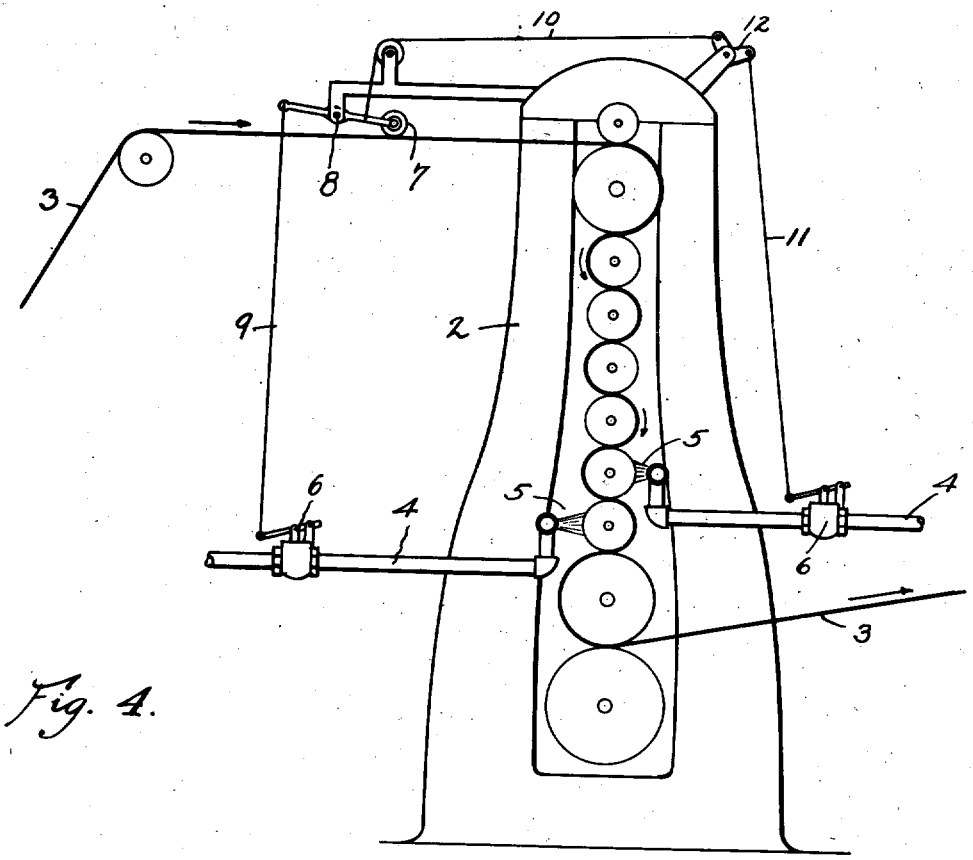
Fig. 4 illustrates an equipment for spraying liquid wax upon a roll or rolls of the stack, and means for stopping the spraying in case of a break in the paper sheet.

Referring to Fig. 1, the paper web is assumed to be coming from the drier section of the paper making machine, thence passes thru one or more calender stacks and from there passes to the winder section.

Two calender stacks *c* and *c'* are shown. In a simpler form of machine, however, a single calender stack will answer. A trough holding the liquid wax is provided for one or two of the rolls of the stack, according to whether one or both sides of the paper web is to be waxed. The wax is applied to the rolls and by the latter to the paper sheet.

Where only a single calender is employed, the waxing is done by the rolls in the lower part of the stack, so that the paper web will have to run thru the upper rolls and in that way have its fibers firmly compressed, and rendered less absorbent, before the wax is applied.

Two or more calender stacks may be employed if it is desired to render the paper web very hard and correspondingly reduce its absorbency.

Where two calender stacks are used, the first stack *c* may be used as an auxiliary to perform merely the duty of compressing the paper web firm and hard.

In the simpler type of machine a single calender stack has been found to work well in practice, if the absorptiveness of the paper web be controlled by rendering the web moist; that is, increasing the moisture content of the web. This may be done by applying to one or both sides a mist-like spray of water to the web as it comes from the driers, and before passing to the calender section, as indicated at *s* and *s'*.

The waxing of the paper web is done while passing thru the calender section of the machine as already mentioned.

In the simple type of machine having only a single calender stack, a trough containing the liquid wax is provided on one or two rolls of the lower part of the calender stack. Where wax is used it is maintained liquid by any convenient means of heating the trough; for instance, by steam coils, such means not being shown. But where wax emulsions or liquid wax in any form is used, heating of course is not necessary.

Waxing both sides of the paper web may be deemed preferable for certain sheets of paper. In such two waxing troughs are employed placed, of course, on opposite sides of adjacent rolls of the calender stack; the wax being applied to the rolls and by the latter carried to, and impressed on the paper.

The rolls of the calender stack by which the wax is applied to the paper web may be heated in any convenient way if deemed preferable.

When two calender stacks are employed, the first may be used as an auxiliary compression roll; or it may be used to apply the film of wax, and the second calender stack *c'* may be used to do the finishing on the waxed surface or surfaces of the paper web. In the latter arrangement, the travel of the web from the stack *c* to the stack *c'* thru the air may be sufficient to set the wax. In order to promote such setting, one or more rolls of the calender stack following the application of the wax may be cooled by water pipes, indicated by *w*, or by external sprays on these rolls, arranged as convenient and therefore not shown.

When two calender stacks are employed, and the first stack is used merely as an auxiliary means for compressing firmly the fiber of the web, the second stack *c'* may be provided with the wax containing troughs, as indicated at *t'*, *t'*.

In order to confine the application of the wax within the limits of one or more longitudinally extending sections, or strips, of the web as *u* in Fig. 3, the waxing troughs *t* or *t'* are provided with arms *y*, Fig. 3, keeping the wax from the roller portions *x* and permitting the wax to have contact only with the circumferential areas *x'* of the roll. In that way the web has left on it unwaxed marginal and middle frictional strips, *v*, *v*, and the cooperative rotation of the rolls of the stack against each other is assured; without which, the smoothing and finishing of the waxing operation cannot, in my opinion, be accomplished in the most efficient manner.

The unwaxed strips *v* of the waxed sheet are later cut away.

Fig. 4 represents a calender stack 2 thru which a sheet of paper 3 is run for waxing. The melted wax is applied thru pipes 4, 4 connected to a convenient source of supply, and projecting sprays 5 on the opposite faces of two adjacent rolls of the stack. Each of the pipes 4 is provided with a valve 6. The pipe valve is held normally open, by a traveler 7 running on the sheet 3; the traveler being pivoted at 8 and connected with the valve 6 by a wire 9, and by wires 10, 11 connected thru a bell-crank 12. In case of a break in the paper sheet 3 of the roller 7 would drop, and thus shut off the valves 6, 6. The particular purpose of the modification shown by Fig. 4 is to apply the wax in the form of a spray, and to insure that the spray will be cut off in case of breakage of the paper sheet.

I claim:

1. The method of both making and waxing a sheet of paper in a single operation by a paper making machine, which consists in reducing the absorptiveness of the paper web as it comes from the drier section of the machine and applying a film of wax to the web thru the medium of one or more rolls of the calender stack to the circumferential surfaces of which roll is fed a film of the waxing liquid, setting the wax film on the paper by cooling one or more of the adjacent rolls of said stack following the roll applying the wax.

2. In the method of both making and waxing a sheet of paper in a single operation by a paper making machine, which consists in reducing the absorptiveness of the paper web as it comes from the drier section of the machine, and applying a film of wax to the web thru the medium of one or more rolls of the calender stack to the circumferential surfaces of which roll is fed a film of the waxing liquid, and confining the application of the wax to a certain circumferential area of the wax-applying roll and thereby to a certain longitudinal strip of the web, whereby to assure cooperative frictional rotation of said rolls.

3. In the method of both making and waxing a sheet of paper in a single operation by a paper making machine, which consists in applying a film of wax to the web thru the medium of one or more rolls of the calender stack to the circumferential surfaces of which roll is fed a film of the waxing liquid, and confining the application of the wax to a certain circumferential area of the wax-applying roll and thereby to a certain longitudinal strip of the web, thereby to assure cooperative frictional rotation of said rolls.

MAX OBERDORFER.